June 17, 1947.　　　M. H. PHILLIPPI　　　2,422,256

FLEXIBLE REFLEX REFLECTING FILM

Original Filed Feb. 13, 1940　　2 Sheets-Sheet 1

INVENTOR.
MATTHEW H. PHILLIPPI

June 17, 1947.   M. H. PHILLIPPI   2,422,256

FLEXIBLE REFLEX REFLECTING FILM

Original Filed Feb. 13, 1940   2 Sheets-Sheet 2

INVENTOR.
MATTHEW H. PHILLIPPI
BY
Attorney

Patented June 17, 1947

2,422,256

UNITED STATES PATENT OFFICE 2,422,256

FLEXIBLE REFLEX REFLECTING FILM

Matthew H. Phillippi, St. Paul, Minn., assignor, by mesne assignments, to Minnesota Mining & Manufacturing Company, St. Paul, Minn., a corporation of Delaware Original application February 13, 1940, Serial No. 318,701. Divided and this application August 12, 1944, Serial No. 549,217

3 Claims. (Cl. 40—135)

This application is a division of my application filed February 13, 1940, Serial No. 318,701, which has matured into Patent 2,403,752, dated July 9, 1946.

My invention relates to an improvement in flexible reflex reflecting films, wherein it is desired to provide a flexible film of reflex reflecting elements which may be used either in the manner of a decalcomania transfer, or may be used as a coating over signs of various types.

It has been previously known that small regularly shaped elements of transparent material such as glass, and preferably in the form of spheres, cubes, and any other regularly shaped geometrical figures, whose height equals the diameter and the like, have been previously used for attracting attention, and for decorating purposes. It has further been found that by placing these elements closely together, and providing a large number of such elements, a bright reflex reflection may be obtained. The elements may be applied in any one of a number of ways. In every instance, however, the elements are attached by coating the surface with a coating of adhesive, and placing the elements in contact with the adhesive. This process, while simple, is not always convenient.

It is the object of the present invention to provide a film bearing reflex reflecting elements; and to form this film flexible so that it may be adhered to the surface of a sign or sign base. The film may be either in the form of a transparent flexible film bearing the reflex reflecting elements; or may if desired be in the form of a decalcomania transfer. In the latter case, the design is held upon a decalcomania base by a suitable paste or the like; and the design is coated with the reflex reflecting elements. The transfer is applied in the usual manner, the base being removed through the use of a solvent for the paste. Thus, when applied, a transfer design is provided in which the design is coated with the reflecting elements.

It is a purpose of my invention to provide a transfer decalcomania, sign, or gummed label having a brilliantly visible surface thereupon capable of attracting attention or of conveying information. Such transfers, signs and labels have all of the advantages commonly known to exist for such articles; and have the added advantage of the brilliant reflecting surface thereon. Labels and decalcomanias, for example, may be readily transported and handled; and may be applied by anyone familiar with the usual process of applying such articles, or capable of reading and following simple directions. At the same time, the labels, signs and decalcomanias which I produce have the added brilliance and attractiveness of a hand prepared and individually formed reflex reflecting sign.

It is a further purpose of my invention to provide a flexible film bearing reflex reflecting elements which may be applied as a film over a previously formed or constructed sign. Thus in order to improve the appearance of a sign already in use, it is only necessary to apply over the surface of the sign a transparent film bearing the reflex reflecting elements. When applied, the sign is given the same appearance as if it had been coated with an adhesive, and covered with the reflecting elements. This is extremely important, as it provides an inexpensive way of treating signs already in existence and which might otherwise be costly to provide a reflecting surface upon.

It will be understood that the application of reflex reflecting elements to a surface requires special knowledge and special supplies. In the treatment of a sign previously made and suspended out of doors, it has been previously almost essential to remove the sign and work on the same where the sign may be moved about for ease in applying the reflecting elements. With my new flexible film, it is only necessary to apply a coating of adhesive upon the sign, and to adhere my transparent film bearing the reflecting elements over the surface. Thus my construction is extremely advantageous for use upon previously constructed signs or displays. No special equipment or knowledge is necessary to apply the film.

The present process is particularly applicable to flexible sheets or films of homogeneous materials as regenerated cellulose, cellulose derivatives, such as ethyl cellulose, methyl cellulose, nitrocellulose, and cellulose acetate gelatin, casein and synthetic or natural resins. Such materials are usually transparent, but it may be understood that materials which are somewhat translucent or otherwise expressed as having one homogeneous continuous phase, such as Glassine, may be processed as herein described. The sheets or films may be colorless, slightly tinted, dyed, otherwise colored, or entirely opaque, as may be desired for the purpose for which they are to be employed.

It is a feature of my invention that my flexible film may be in any one of a number of forms. My reflex reflecting elements may be mounted upon a decalcomania transfer, or upon a transparent flexible base, as has been described. In addition, my film may be in the form of a gummed label. Such a gummed label may be provided with numerals, designs, letters, symbols, or combinations or such indicia which have been printed, lithographed, silk screened or hand painted on a sheet of material. The sheet may be provided with a paste or gum solution, or with a suitable glue which, when moistened, will adhere to a desired surface. Such gummed labels may be rendered extremely effective by a coating of reflex reflecting elements partially embedded in an adhesive coating on the label.

These and other objects and novel features of my invention will be more clearly and fully set forth in the following specification and claims.

In the drawings forming a part of my specification:

Figure 1:
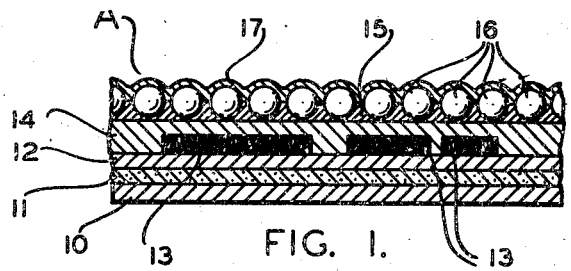
Figure 1 is a diagrammatic cross-sectional view, in greatly enlarged form, of a decalcomania transfer showing my new construction.

In Figure 1 of the drawings, I disclose a typical form of decalcomania constructed in accordance with the teachings of my invention. This form of decalcomania A is provided with a backing sheet 10, which may be, and ordinarily is, a sheet of paper. The backing sheet 10 may, however, comprise a sheet of metal, wood, Celluloid, or any one of a great number of other substances. The only requirement of such a backing sheet is that it form a base for supporting the removable portion of the transfer.

The backing sheet 10 is treated with a paste solution. This layer of paste solution is diagrammatically illustrated at 11. The paste 11 must be such that when moistened with a suitable solvent, it will soften and permit the removal of the transfer from the backing sheet 10. In use, the backing sheet 10 is removed from the decalcomania, and the remainder of the sign is used.

Figure 7:
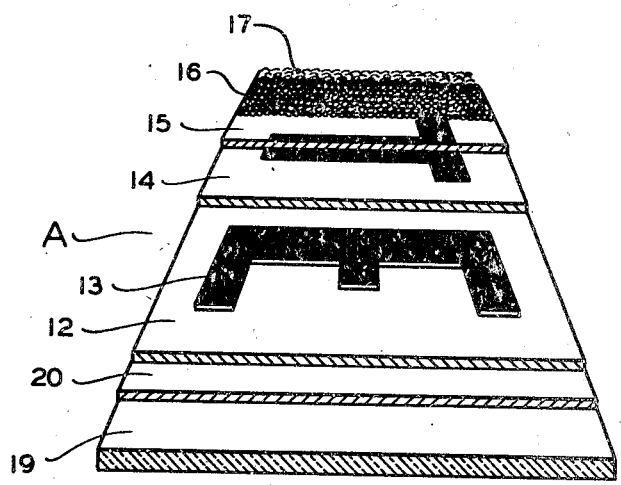
Figure 7 is a diagrammatic perspective view of the transfer shown in Figure 1 after application, showing the relationship of the elements thereof.

A film of varnish, lacquer, or other material, indicated at 12, is coated, sprayed, printed, lithographed, silk screened, or hand painted upon the paste layer 11. This film 12 may cover the entire surface of the paste layer, or may be placed thereon in a predetermined pattern. The film 12 forms the removable base of the transfer, and obviously may be of regular or irregular outline, as is desired. In Figures 1 and 7 of the drawings, the film 12 is shown continuous over the surface illustrated; but this film may be in the outline form of letters, numerals, designs or the like if desired, or may be in proper outline form to enclose a series of letters, numerals, or designs.

Imprinted or in other ways affixed overlying the film 12 I provide the design 13. This design may, of course, be printed, lithographed, silk screened, or hand painted upon the film surface to provide a desired display. The design may be in one or numerous colors, or may be black or white. The design 13 is preferably covered with a protective coating 14, such as varnish, lacquer, or other suitable material. The protective coating fills the interstices formed by the design and provides a relatively smooth working surface.

Upon the surface of the protective coating 14, I provide a coating of adhesive 15. This adhesive may be any suitable transparent or translucent material which will form a reflective backing for the reflex reflecting elements, and which will hold these elements securely to the body of the decalcomania A. While the adhesive 15 is in a plastic state, the reflex reflecting elements 16 are applied in any suitable manner, these elements being partially embedded in the adhesive coating 15, and secured thereby. The reflex reflecting elements may be formed of clear, transparent, or colored glass or other transparent material, and may be spherical, cubical, or of other regularly shaped geometrical form in which the height substantially equals the diameter and the like.

Upon the surface of the reflex reflecting elements, I preferably provide a coat of varnish or any transparent material for protection against deterioration. This top coat 17 seals the recesses between the reflecting elements 16 and prevents moisture from entering about the reflecting elements and damaging the effectiveness of the completed transfer.

The manner in which the decalcomania A is used is believed obvious. As shown in Figure 1, the transfer including the film 12, design 13, protective coating 14, adhesive 15, reflector elements 16, and top coat 17 is removed from the backing sheet 10 by using a suitable solvent for softening the paste layer 11. This transfer is adhered upon the base 19 by any suitable means. In some instances the paste layer 11 is such that this same adhesive may be used for adhering the transfer. In the usual practice, however, a coating of varnish or other adhesive 20 is placed upon the sign base 19, and the film 12 is adhered to the base 19 in this manner.

Figure 2:
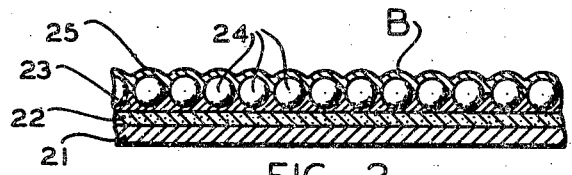
Figure 2 is a diagrammatic cross-sectional view of a modified form of decalcomania transfer.
Figure 8:
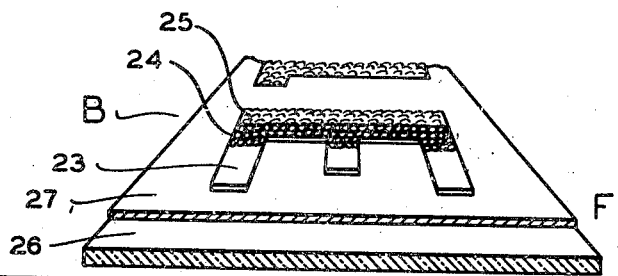
Figure 8 is a diagrammatic perspective view of the transfer illustrated in Figure 2 of the drawings, after application thereof.

A slightly different type of decalcomania construction is shown in Figures 2 and 8 of the drawings. The decalcomania B illustrated in these figures is provided with a backing sheet 21 which may be made of any suitable material, but which is usually a flexible paper sheet. A coating of paste 22 is applied to one surface of the backing sheet 21, which paste may be softened by a suitable solvent such as water. The reflecting medium 23 is imprinted upon the paste coating 22. This reflecting medium may be of transparent material, or may be of opaque material. In the construction shown, the reflecting medium 23 is printed, lithographed, silk screened, or hand painted upon the coating 22, in the form of letters. The reflecting medium is colored, and forms an adhesive base to which the reflex reflecting elements 24 are adhered. A top coat 25 of varnish, lacquer or the like is preferably applied over the reflecting elements 24 to fill the interstices between the same, and to seal any cracks, enclosing the elements 24 in a weather-proof seal.

Figure 8 shows the decalcomania B after the backing sheet 21 has been removed by softening the paste film 22 with a suitable solvent. The reflecting medium 23 is adhered to the base 26 of the sign by means of a suitable adhesive coating 27 which may be locally applied just beneath the reflecting medium, or which may be applied over the entire general area of the reflecting medium when removed from the backing sheet.

Figure 3:
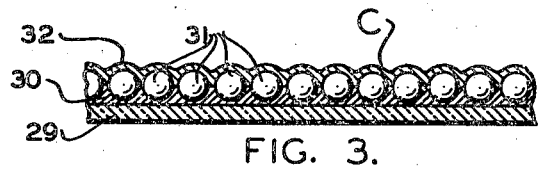
Figure 3 is a diagrammatic cross-sectional view of a clear transfer or transparent reflex reflecting film.
Figure 4:
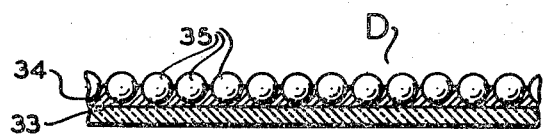
Figure 4 is a diagrammatic cross-sectional view of a clear transfer similar to that shown in Figure 3, without the top coating thereupon.

Figure 3 illustrates a clear transfer C which may be coated over designs and indicia to enhance the appearance of the same. The transfer C is provided with a transparent base sheet 29, which may be of any suitable transparent material such as Glassine, Cellophane, Kodapak or regenerated cellulose films. Upon the surface of the base sheet 29 I provide a coating 30 of clear varnish, lacquer, or transparent adhesive material.

Embedded in the adhesive coating 30, I provide a layer of reflex reflecting elements 31. The elements 31 may if desired be sealed in place by a top coat 32 (of varnish, lacquer or the like) which fills the interstices between the elements and acts to weatherproof the transfer.

The clear transfer D is identical with the transfer C with the exception that the top coat is eliminated. In this form of my invention the transparent film 33 is coated with a varnish, lacquer, or clear adhesive 34, and the reflex reflecting elements 35 are embedded therein. This film may be adhered over a design, emblem, or indicia to improve the appearance of the same, and to make the sign more visible and more legible when light strikes the same.

Figures 9, 10:
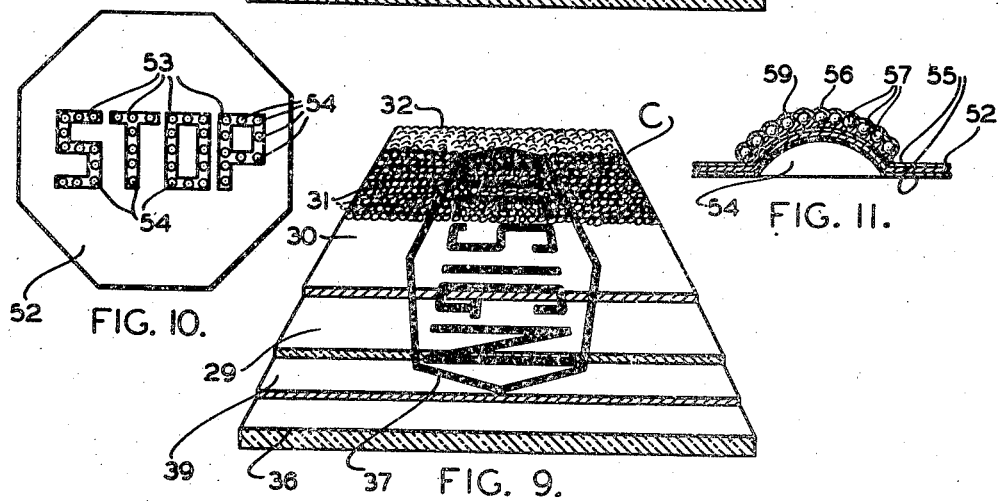
Figure 9 is a diagrammatic perspective view of the clear transfer shown in Figure 3 of the drawings, after application thereof.
Figure 10 is a front elevational view of a highway sign.

Figure 9 illustrates the film C applied to a design or base. The sign base 36 is provided with a design 37 thereon which is coated with a suitable transparent adhesive, varnish, or lacquer coating 39. The film base 29 is adhered to this base 36, insuring a close contact between the sign base 36 and the film base 29.

It has been found that actual connecting contact is necessary in order to provide the necessary transparency. When the film base 29 together with the adhesive 30 and reflecting elements 31 are placed upon the base 36, the film C does not appear perfectly transparent. However, when actually adhered thereto, the design 37 may be seen with magnified clearness through the transfer C.

Figure 5:
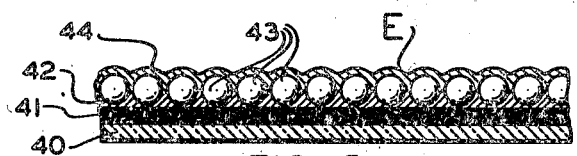
Figure 5 is a diagrammatic cross-sectional view of a transfer design to be applied to a surface to be covered.

In Figure 5 of the drawings I disclose a design on a base sheet covered with reflex reflecting elements. In this transfer E, the base may be any flexible sheet 40 bearing a design 41 applied in any manner thereto. The sheet 40 may be transparent, as shown, or may be opaque, as in a label or the like. A coat of varnish or lacquer 42 is applied over the design in the form of an adhesive, and the reflex reflecting elements 43 are embedded in the adhesive to substantially half their depth. A top coating of varnish 44 or the like is preferably applied over the reflecting elements 43, as a protection against the elements.

Figure 6:
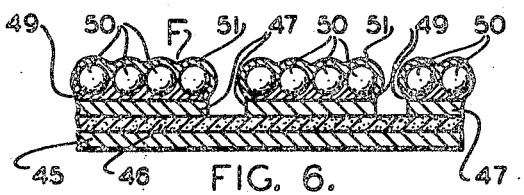
Figure 6 is a diagrammatic cross-sectional view through a decalcomania transfer having a non-continuous removable film thereon.

In Figure 6 of the drawings I provide a decalcomania transfer having a non-continuous film thereupon. The transfer F is provided with a backing sheet 45 coated with a paste solution 46. A design printed in varnish, lacquer, or other film forming material, indicated by the numeral 47, forms a base for the removable portion of the transfer. The varnish or lacquer film 47 is coated with a reflecting medium 49 which may be transparent, or may be opaque ink or the like.

Reflex reflecting elements 50 are embedded in the reflecting medium 49 to about half their depth, and a top coating 51 seals the reflecting elements against the weather. The design 47 may thus be removable in one or more separate pieces from the backing sheet 45.

Figure 11:
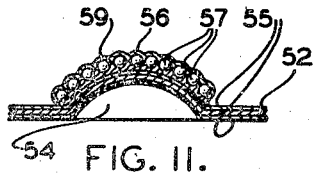
Figure 11 is a sectional view through a portion of the sign of Figure 10, showing the manner in which the transfer may be applied thereto.

In Figure 10 I disclose a highway sign 52 having letters or figures 53 thereupon. A series of rounded protuberances 54 are formed in the letters 53. As shown in Figure 11, the sign base 52 is provided with a covering 55 of paint on both sides thereof. A transparent film 56 is adhered to the surface of the protuberances 54, having reflex reflecting elements 57 embedded therein. A top coating 59 of varnish or lacquer seals the reflecting elements from the weather.

In accordance with the patent statutes, I have described the principles of construction and operation of my reflex reflecting film; and while I have endeavored to set forth the best embodiments thereof, I desire to have it understood that these are only illustrative of methods of carrying out my invention, and that obvious changes may be made within the scope of the following claims without departing from the spirit of my invention.

I claim:

1. In combination with a base having a reflective surface, an overlying preformed flexible transparent lenticular optical sheet of the character described, having a multiplicity of small transparent contiguous glass beads partially embedded in a transparent bonding medium to form a uniform surface layer thereof, said optical sheet causing "reflexive" reflection of incident light.

2. In combination with a base having a reflective surface, an overlying preformed flexible transparent lenticular optical sheet of the character described, having a flexible transparent film backing, a transparent flexible bead-bonding coat united thereto and a layer of small transparent glass beads partially embedded therein, substantially reaching said backing film and spaced by the latter from the reflective surface of the underlying base, said optical sheet causing "reflexive" reflection of incident light.

3. In a sign adapted for outdoor use involving exposure to weathering conditions, a base having a reflective surface forming a design or indicia and an overlying preformed weatherproof flexible transparent optical sheet of the character described, having a flexible transparent film backing, a transparent flexible weatherproof bead-bonding coat united thereto and a layer of small transparent glass beads partially embedded therein, substantially reaching said backing film and spaced by the latter from the surface of the underlying base, said optical sheet causing "reflexive" reflection of incident light.

MATTHEW H. PHILLIPPI.

REFERENCES CITED

The following references are of record in the file of this patent:

UNITED STATES PATENTS

| Number | Name | Date |
|---|---|---|
| 823,445 | Schramm | June 12, 1906 |
| 1,176,746 | Federico | Mar. 28, 1916 |
| 1,580,921 | Scherer | Apr. 13, 1926 |
| 1,902,440 | Gill | Mar. 21, 1933 |
| 2,094,428 | Fulton | Sept. 28, 1937 |
| 2,143,946 | Hubter | Jan. 17, 1939 |